United States Patent
Mohen et al.

(10) Patent No.: US 10,223,543 B1
(45) Date of Patent: Mar. 5, 2019

(54) DYNAMIC EXTERNAL VIEWS WITH ENCRYPTION TO SUPPORT GLOBAL DATA COMPLIANCE FOR GLOBAL ARCHIVES

(71) Applicant: EMC Corporation, Hopkinton, MA (US)

(72) Inventors: Michael T. Mohen, Millington, MD (US); Ramesh B. Addanki, San Ramon, CA (US); Jeroen Mattijs van Rotterdam, Berkeley, CA (US); Una T. Kearns, Dublin (IE); David Humby, Ontario (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 113 days.

(21) Appl. No.: 14/871,414

(22) Filed: Sep. 30, 2015

(51) Int. Cl.
| | | |
|---|---|---|
| *H04L 29/06* | (2006.01) | |
| *G06F 21/62* | (2013.01) | |
| *H04L 9/08* | (2006.01) | |
| *G06F 21/60* | (2013.01) | |

(52) U.S. Cl.
CPC ........ *G06F 21/6227* (2013.01); *G06F 21/602* (2013.01); *H04L 9/083* (2013.01); *H04L 9/0891* (2013.01); *H04L 63/0428* (2013.01); *G06F 2221/2107* (2013.01); *H04L 2209/04* (2013.01); *H04L 2463/041* (2013.01)

(58) Field of Classification Search
CPC .............. G06F 21/6227; G06F 21/602; G06F 2221/2107; H04L 9/083; H04L 9/0891; H04L 63/0428; H04L 2209/04; H04L 2463/041
See application file for complete search history.

(56) References Cited

U.S. PATENT DOCUMENTS

| | | | |
|---|---|---|---|
| 9,355,279 B1* | 5/2016 | Takahashi | G06F 21/72 |
| 9,514,324 B1* | 12/2016 | Potlapally | G06F 21/6218 |
| 2010/0082652 A1* | 4/2010 | Jones | G06Q 30/02 |
| | | | 707/758 |
| 2011/0145580 A1* | 6/2011 | Auradkar | H04L 63/0428 |
| | | | 713/170 |
| 2012/0130973 A1* | 5/2012 | Tamm | G06F 17/30545 |
| | | | 707/706 |
| 2014/0181889 A1* | 6/2014 | Black | G06F 21/55 |
| | | | 726/1 |
| 2014/0281514 A1* | 9/2014 | Erofeev | G06F 21/6218 |
| | | | 713/165 |
| 2016/0087946 A1* | 3/2016 | Yang | G06F 21/62 |
| | | | 713/171 |
| 2016/0140349 A1* | 5/2016 | Brown | G06F 21/602 |
| | | | 713/189 |

* cited by examiner

*Primary Examiner* — Tri M Tran
(74) *Attorney, Agent, or Firm* — Chamberlain, Hrdlicka, White, Williams, & Aughtry (57) ABSTRACT

In general, embodiments of the technology relate to encryption requirements for distributed data archives. More specifically, embodiments of the technology relate to accessing globally distributed data archives by way of local query nodes while providing that encryption rules are enforced.

18 Claims, 9 Drawing Sheets

DYNAMIC EXTERNAL VIEWS WITH ENCRYPTION TO SUPPORT GLOBAL DATA COMPLIANCE FOR GLOBAL ARCHIVES

BACKGROUND

Significant amounts of data (e.g., documents, records, images, audio-visual content) are stored on computing systems. It is often the case that this data includes confidential information (e.g., information that is to be kept private or only distributed under certain circumstances to certain individuals). Traditional approaches for ensuring that access to confidential information are limited to appropriate individuals do not contemplate globally distributed data.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology relate to encryption requirements for distributed data archives. More specifically, embodiments of the technology relate to accessing globally distributed data archives by way of local query nodes while providing that encryption rules are enforced. For example, certain information may need to be stored within a particular geographic boundary but may be allowed to leave under the condition that it is encrypted.

Figure 1:
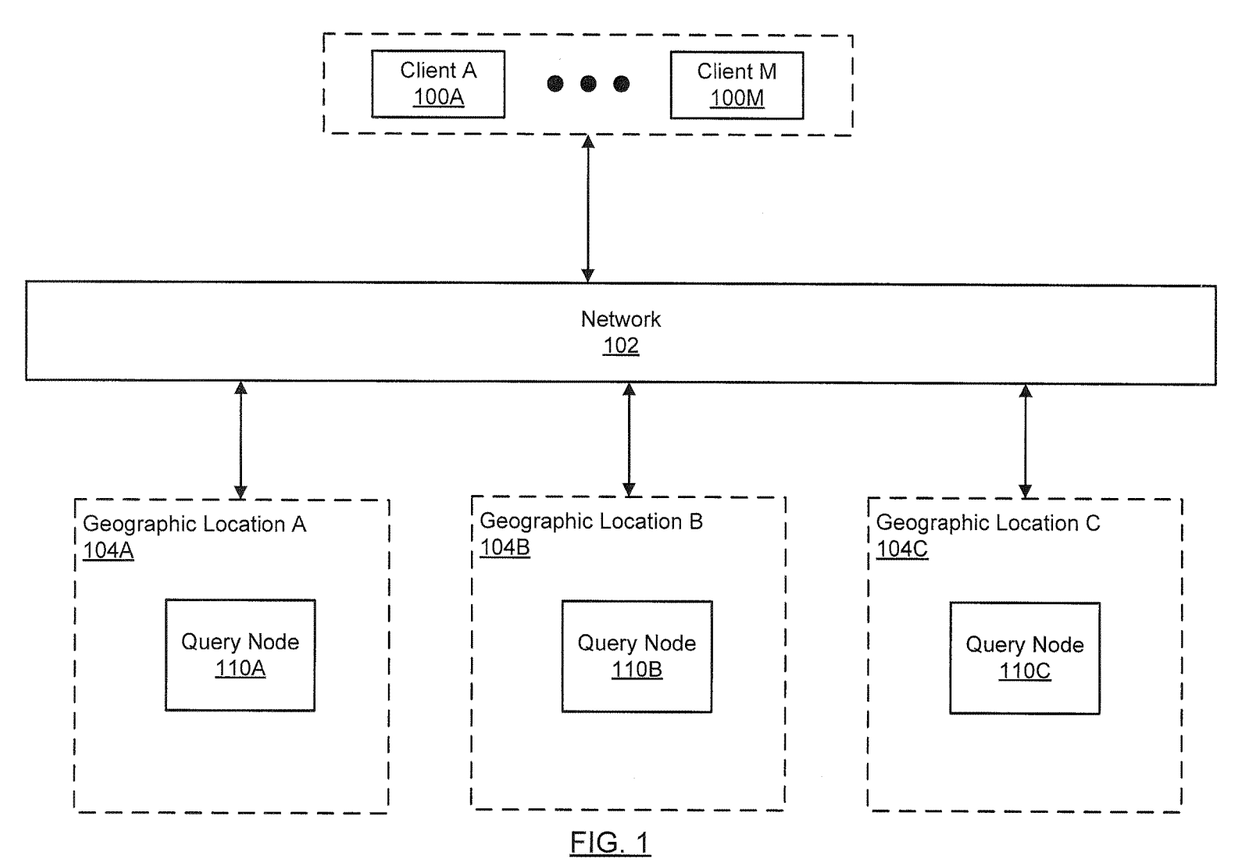
FIG. 1 shows an example system in accordance with one or more embodiments of the technology.

FIG. 1 shows an example system in accordance with one or more embodiments of the technology.

As shown in FIG. 1, the system includes one or more clients (100A-100M), a network (102), and one or more query nodes (110A-C) in different geographic locations (104A-C). Each of these components is described below.

Figure 3:
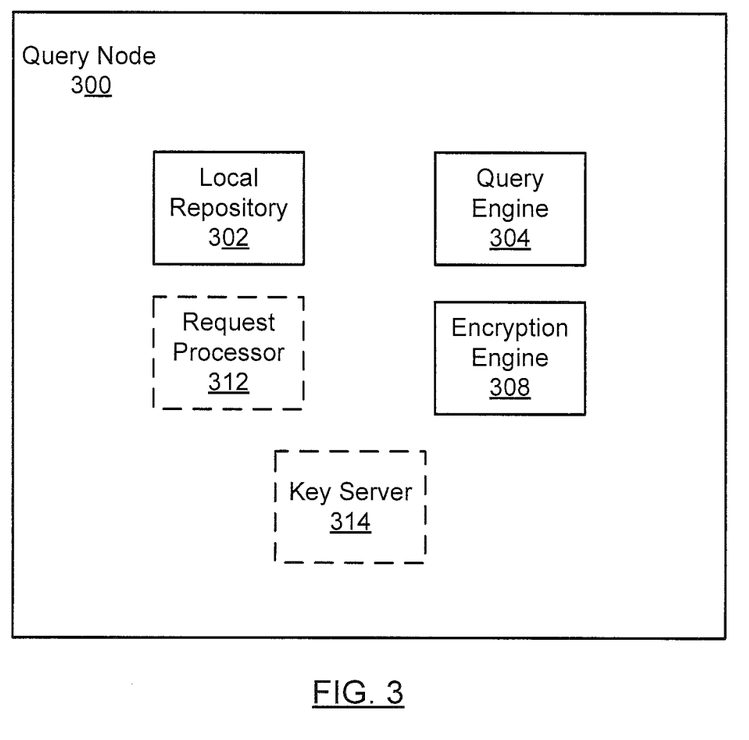
FIG. 3 shows an example of a query node in accordance with one or more embodiments of the technology.
Figure 4:
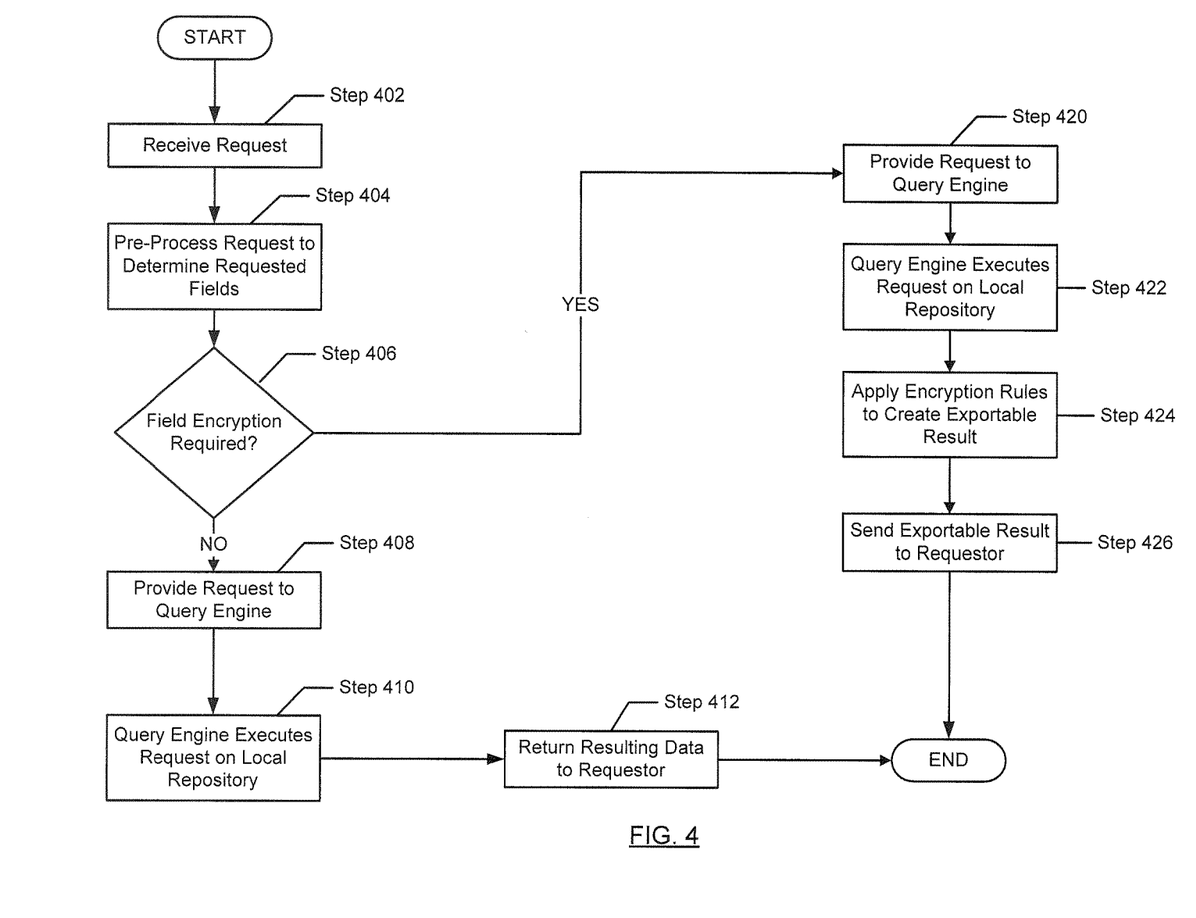
FIG. 4 shows an example method for requesting data in accordance with one or more embodiments of the technology.

In one or more embodiments in accordance with FIG. 1, the query nodes (104A-C) correspond to one or more computing devices (See e.g. FIG. 9) that include functionality to process queries (See e.g. FIG. 4). Additional detail about the query nodes is provided in FIG. 3.

In one or more embodiments, each geographic location (104A), (104B), and (104C) represents a different country (i.e. United States, Russia, Canada, Germany). However, those skilled in the art will appreciate that the geographic locations are not restricted solely to countries. For example, in one or more alternative embodiments, the geographic locations could also be cities, states, floors of a building, or boundaries established by sets of GPS coordinates.

Further, while FIG. 1 shows query nodes distributed across geographic boundaries, other exemplary embodiments of the technology may be implemented using query nodes associated with given portions (e.g., departments) in a company. For example, a doctor's office may restrict particular data from being retrieved by another doctor's office or insurance company. In another example, certain data may be restricted only to human resources personnel and not available to maintenance personnel. In one or more embodiments, the encryption rules may also be related to levels of security clearance within an organization. Alternatively, the encryption rules may also be related to one or more network domain policies. The technology is not limited to the aforementioned examples.

In one or more embodiments of the technology, a client (100A, 100M) may be any computer system or process executing on a computer system that issues a read request over to a query node (110A-C) over the network (102). In one embodiment of the technology, the clients (100A, 100M) may each include a processor (not shown), memory (not shown), and persistent storage (not shown). In one embodiment of the technology, the clients may be implemented using computing devices shown in FIG. 9.

In one or more embodiments, the query nodes (110A-C) are connected via the network (102). Additionally, each of the clients (100A, 100M) may also be connected to each other or the query nodes (110A-C) through the network (102). The network (102) may be a wired network, a wireless network, or any combination thereof. Further, the network (102) may be a wide area network (e.g. the Internet) or a local area network (LAN).

Figure 2:
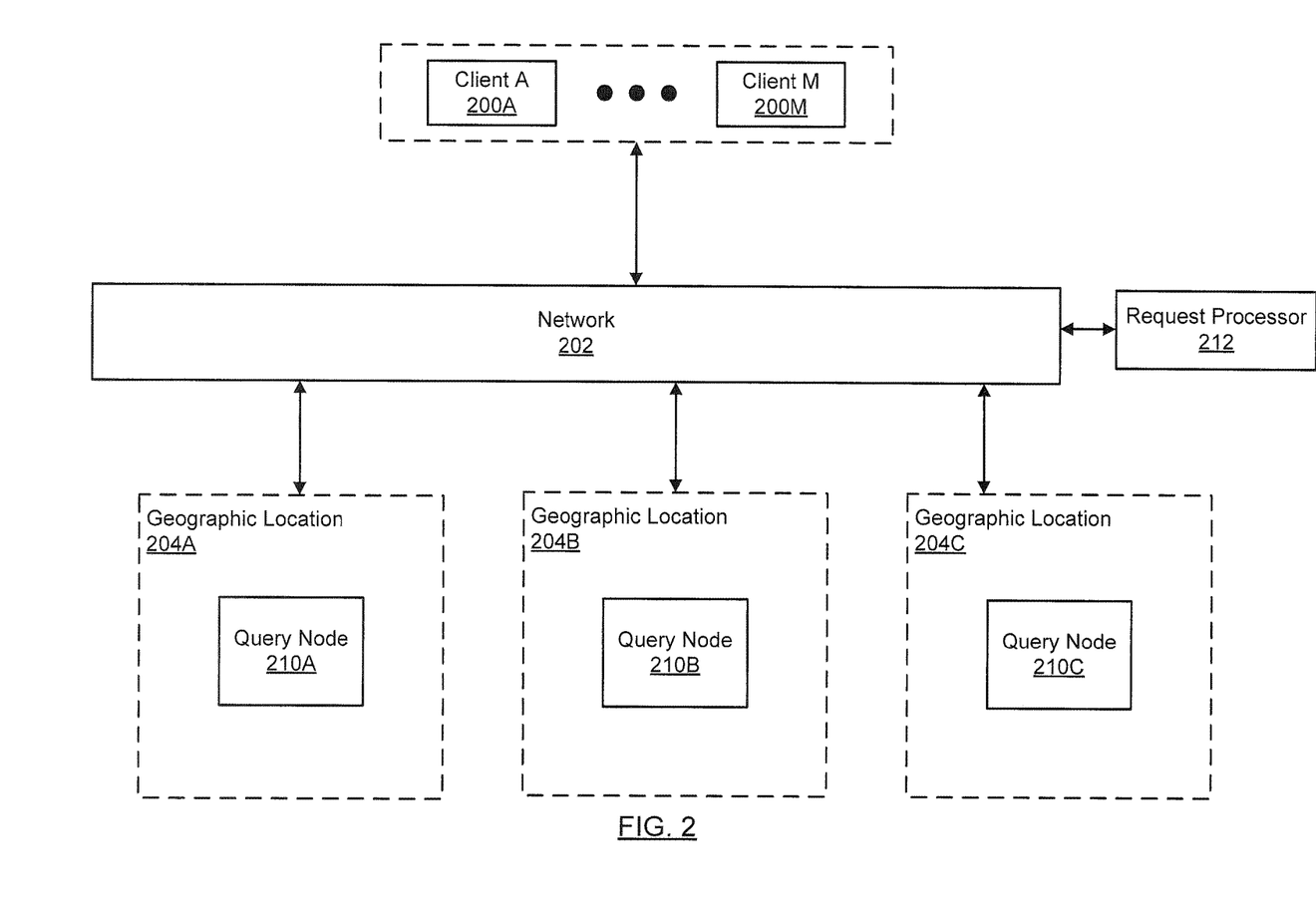
FIG. 2 shows another example system in accordance with one or more embodiments of the technology.

FIG. 2 shows an example system in accordance with one or more embodiments of the technology.

As shown in FIG. 2, the system includes one or more clients (200A, 200M), a network (202), a request processor (212) and one or more query nodes (210A-C) in different geographic locations (204A-C). Each of these components is described below.

In one or more embodiments in accordance with FIG. 2, the query nodes (210A-C) are substantially similar to the query nodes described in FIG. 1; however, the query nodes shown in FIG. 2 may not each include their own request processor (See e.g. FIG. 3, 312). In one or more embodiments the query nodes (210A-C) may be connected to a request processor (212). More specifically, in one or more embodiments, the request processor (212) may be a single request processor servicing requests for all of the query nodes (210A-C). Alternatively, there may be a set of request processors, for example, one located in each of the geographic locations (204A), (204B), and (204C).

In one embodiment of the technology, the request processor (212) includes functionality to track what data (or types of data (also referred to as datatypes)) are stored in each of the local repositories (FIG. 3, 302) maintained by each of the individual query nodes (See e.g. FIG. 3, 300). The request processor (212) may obtain this information from the individual query nodes. Alternatively, the request processor (212) may obtain the aforementioned information from another source. The request processor (212) may use this information to implement at least a portion of the method shown in FIG. 4 and the functionality described in FIGS. 5 and 8A-8B.

In one or more embodiments of the technology, a client (200A, 200M) may be any computer system or process executing on a computer system that issues a read request to the request processor (212) over the network (202). In one embodiment of the technology, the clients (200A, 200M) may each include a processor (not shown), memory (not shown), and persistent storage (not shown). In one embodiment of the technology, the clients may be implemented using computing devices shown in FIG. 9.

In one or more embodiments, the query nodes (210A-C) are connected by the network (202). Additionally, each of the clients (200A, 200M) may also be connected to each other, the request processor (212), or the query nodes (210A-C) through the network (202). The network (202) may be a wired network, a wireless network, or any combination thereof. Further, the network (202) may be a wide area network (e.g., the Internet) or a local area network (LAN).

FIG. 3 shows an example of a query node in accordance with one or more embodiments of the technology.

As shown in FIG. 3, the query node (300) may include a local repository (302), a query engine (304), an encryption engine (308), and optionally a request processor (312) and a key server (314). Each of these components is described below.

Figure 8A:
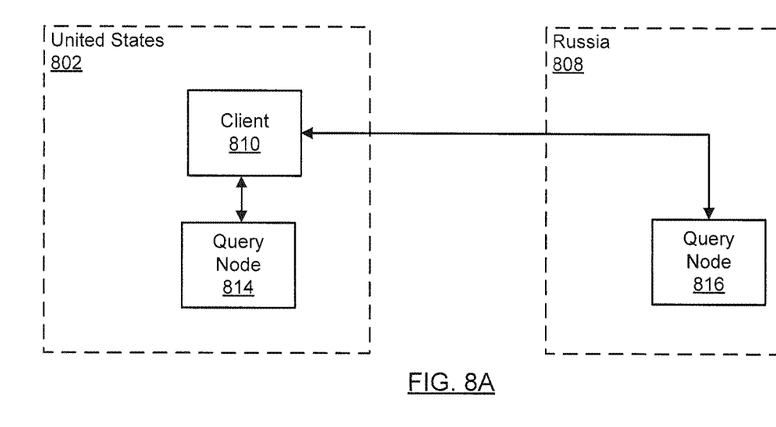
FIG. 8A shows an example in accordance with one or more embodiments of the technology.
Figure 8B:
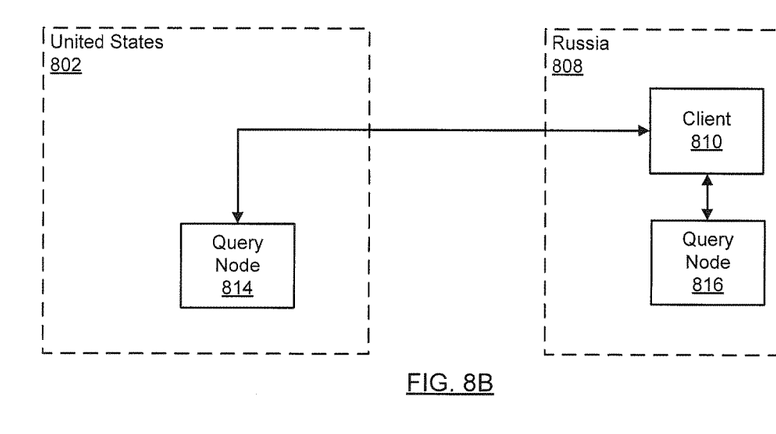
FIG. 8B shows an example in accordance with one or more embodiments of the technology.
Figure 9:
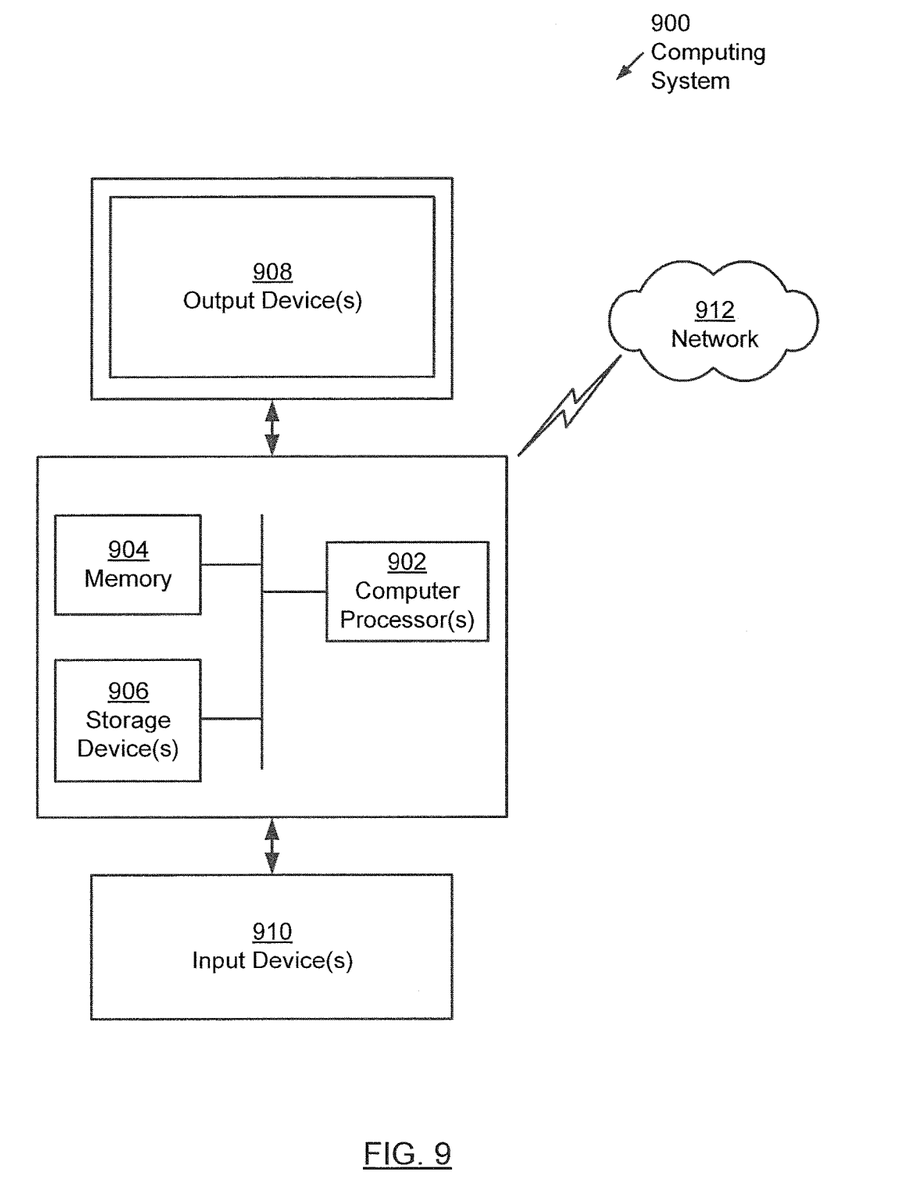
FIG. 9 shows a computing system in accordance with one or more embodiments of the technology.

In one or more embodiments, a key server may reside inside the query node (300) itself or there may be one or more external key servers (e.g., key servers implemented on a separate computing devices, see e.g., FIG. 9) distributed throughout the various geographic locations. In one or more embodiments, the key server includes functionality to receive requests and, in response, provide cryptographic keys (symmetric and/or asymmetric) for encrypting or decrypting data. In one or more embodiments, the key server may store or generate keys. Additional detail about the operation of the key server is provided in FIGS. 4-8B.

In one embodiment of the technology, local repository (302) includes persistent storage (e.g., solid state storage, magnetic storage, optical storage, any other type of persistent storage or any combination thereof) in which data (described below) is stored.

Continuing with the discussion of the local repositories, each local repository may store data using any known or subsequently discovered mechanism. The following describes various examples of the mechanisms that may be used to store data. The examples are not intended to limit the technology. In a first example, the local repository may be a set of magnetic hard disks. In a second example, the local repository may be implemented using a computer cluster that is executing a distributed file system. In a third example, the local repository may be implemented using a network file server and one or more block-storage devices (i.e., as a Storage Area Network).

In one embodiment of the technology, the data may be unstructured and/or structured data that corresponds to any type of content that may be stored in the data repository. Examples of content may include, but are not limited to, text files, audio files, image files, relational database records, eXtensible Markup Language (XML) archives, spreadsheets, and hash tables and/or audio-visual files. Further, the local repository may also store metadata associated with the content. Examples of metadata may include, but are not limited to, author, content name, creation time, creation date, size of object, modification time, modification date, content format, e.g., portable document format (PDF), MPEG-4, .txt., etc.

In one or more embodiments, the query engine (304) is a service or process that includes functionality to service requests issued by clients and/or request processors in accordance with FIG. 4 below. More specifically, the query engine includes functionality to evaluate a request and determine whether any data for that request is present in the local repository. Further, the query engine may include functionality to process the retrieved data prior to providing the retrieved data to the encryption engine or the client (or request processor) that issued the request. In one embodiment of the technology, the query engine may be implemented using specialized hardware. Additional detail about the functionality of the query engine is described below in FIGS. 4-8B.

As discussed above, in one or more embodiments of the technology the request processor (312) may reside inside the query node (300) itself or there may be one or more external request processors (e.g., request processors implemented on a separate computing devices, see e.g., FIG. 9) distributed throughout the various geographic locations. In one embodiment of the technology, the request processor (312) includes functionality to receive requests from clients and/or other query nodes and then determine whether the query node (i.e., the query node in which the request processor is located) includes the data necessary to satisfy the request. If any of the data is present on the query node, then the request processor may forward the request (or a modified version of the request) to the query node to service. Further, for any portion of the request that needs to be processed by another query node (i.e., the current query node does not include the data necessary to service the request), the request processor includes functionality to send the request (or a modified version of the request) to another query node. The request processor may also include functionality to aggregate the data received from the various query nodes and to provide the aggregate data to the client. In these scenarios, the request processor is the intermediate requestor and the source requestor is the client. Additional detail about the request processor is described in, e.g., FIG. 4 below.

In one or more embodiments, the encryption engine (308) includes functionality to enforce encryption rules. More specifically, in one or more embodiments the encryption engine (308) maintains a repository of encryption rules. In one or more embodiments, an encryption rule may specify: (i) a requestor, (ii) a location of data, (iii) a type of the data (also referred to as data type), and (iv) a rule to apply when all or some of conditions (i)-(iii) are satisfied. For example, an encryption rule may pertain to the origin of the request from a remote client or node having a particular set of restrictions. Alternatively, an encryption rule may relate to the sensitivity level of the data itself. In another embodiment, the encryption rule may specify that employment records for employees in a given country (i.e., type of the data) cannot be provided to requestors that are location outside the country. The technology is not limited to the aforementioned examples.

In one or more embodiments, the encryption engine (308) may maintain a mapping between encryption keys and one or more of the following: a particular geographic location, a particular data or type of data, a user, and a group of users. In one or more embodiments, the encryption engine (308) includes functionality go select a key(s) to be used to encrypt and/or decrypt a particular piece of data. The encryption engine further includes functionality to: (i) track which keys have been selected for the aforementioned encryption and decryption and (ii) to retrieve the appropriate key(s) in order to perform the requested encryption and/or decryption.

In one or more embodiments of the technology, the encryption engine may define several encryption-related data manipulation rules based on the sequence of operations a particular resulting dataset has undergone. In one or more embodiments, an encryption rule may enforce that a particular field or set of fields be encrypted with one or more encryption keys. Additionally, in one or more embodiments an encryption rule may enforce that an entire dataset be encrypted with one or more encryption keys. Depending on the type of data (e.g., human Resource data such an employee addresses, full names, performance reviews, etc., payroll data such salary information, bonus information, etc.) and the encryption rules that have been configured for that data, particular fields may be eliminated from the resulting dataset. Alternatively, an encryption rule may also enforce that a particular field be masked or tokenized. Further, an encryption rule may enforce that only a count of the number of entries for a particular field is returned. In other words, the encryption engine may apply the encryption rules to a retrieved dataset removing or altering data based upon the rule and ultimately create a resulting exportable dataset. The query node (300) then transmits the exportable result to the requesting entity.

In one embodiment of the technology, the encryption rules may be based on specific geographic locations and boundaries. In one or more embodiments, this enables the distribution of certain types of data outside a geographic boundary only in encrypted form, thereby preventing (or limiting access) (see examples, below) to the data in unencrypted form outside specific geographic locations and/or boundaries.

In one or more embodiments, there may be an optional single global request processor. However, in one or more alternative embodiments, there may also be distributed request processors in each jurisdiction or attached to each query node internally or externally.

In one or more embodiments in accordance with the technology, the query nodes may have one or more local repositories, one or more local query engines, and one or more encryption engines. Thus, one or more embodiments may implement asynchronous or synchronous searching and reporting capabilities by advantageously utilizing multiple local processing nodes to distribute load over the global network while ensuring encryption rules are enforced. Moreover, the local query nodes may allow for the data to be retrieved to local memory for processing without necessitating it to leave a particular geographic boundary.

Additional detail related to the operation of the encryption engine is described below with respect to FIGS. 4-8B.

As described above, in one embodiment, each query node may be implemented using one or more computing devices. In another embodiment, the query engine, request processor, and encryption engine may be implemented in a single computing device operatively connected to the local repository. While various examples of how the query may be implemented have been provided, those skilled in the art will appreciate that the query nodes (300) may be implemented using any combination of software and/or hardware without departing from the technology.

As discussed above, the technology may be implemented using one or more of the exemplary systems shown in FIGS. 1-3. Depending on the implementation of the technology, the client(s) may: (i) issue query requests directly to the query node(s) without any request processor (see e.g., FIG. 1); (ii) issue requests to a single query node, which may then uses its request processor to send requests to other query nodes (see e.g., FIGS. 1, 3); and/or (iii) issue requests to a request processor, which may then send requests to the various query nodes (see e.g., FIG. 2).

While FIGS. 1-3 show a configuration of components, other configurations may be used without departing from the scope of the technology. For example, various components may be combined to create a single component. As another example, the functionality performed by a single component may be performed by two or more components.

Further, while FIGS. 1-3 show a single query node per geographic region, each geographic region may have multiple query nodes. Further, each query node may have multiple local repositories, multiple encryption engines, multiple query engines, and multiple request processors.

While the various steps in the following flowcharts are presented and described sequentially, one of ordinary skill will appreciate that some or all of the steps may be executed in different orders, may be combined or omitted, and some or all of the steps may be executed in parallel.

FIG. 4 shows an example method for processing requests by a query node in accordance with one or more embodiments of the technology. The method shown in FIG. 4 may be implemented, for example, using the system of FIG. 1 or 2.

Turning to FIG. 4, in step 402, the query node receives a request (also referred to as a query request) for data. As discussed above, in one or more embodiments, the request may also be received by a request processor, which determines the one or more query nodes to service the request and transmits the request to the one or more query nodes. Thus, in one or more embodiments, the process according to FIG. 4 may be carried out by each query node receiving a request from a request processor (also referred to an intermediate requestor). Further, in one or more embodiments, the request may be received from a requestor, which may be a client, a query node, or another external entity.

In step 404, the query node pre-processes the request to determine the data fields to service the request and the location of the requestor.

In step 406, a determination is made as to whether any portion of the requested data to service the request requires encryption (i.e. any of the requested data fields have a corresponding encryption rule). If any portion of the requested data does not require any encryption, the process proceeds to step 408. If any portion of the requested data requires encryption, the process proceeds to step 420. In one or more embodiments, the request may contain portions of data that require encryption and portions that do not require encryption. Thus, in one or more embodiments, the process may proceed separately to steps 408-412 and steps 420-426. Alternatively, in one or more embodiments, the process may proceed to steps 408-412 and steps 420-426 simultaneously for parallel execution. However, in one or more embodiments, entire requests may require encryption and other entire requests may not require encryption.

In step 408, the query node provides the request to the local query engine. In step 410, the query engine executes the request on the local repository to retrieve the requested data. Then, in step 412, the query node transmits the resulting unencrypted data to the requestor (which may be an intermediate requestor such as a request processor (see e.g. FIG. 2) or the source requestor such as a client) and the process ends.

Turning back to the case where portions of the requested data require encryption, in step 420 the query node provides the request to the local query engine. In step 422, the query engine executes the request on the local repository to retrieve the requested data.

In step 424, the retrieved data is provided to the encryption engine of the query node. As discussed above, the encryption engine retrieves any encryption rules related to, for example, the location of the requestor or the sensitivity level of the data. The encryption engine then applies the encryption rules to create an exportable result. In one or more embodiments, this may also entail the encryption engine removing portions of the data not allowed to be transmitted or selectively encrypting fields based upon selection criteria.

In one embodiment, the encryption engine may encrypt all of the requested data to create an exportable result. In another embodiment, the encryption engine may pre-process the requested data selectively masking and/or tokenizing portions of the data and then encrypt the resulting dataset to create an exportable result. In another embodiment, the encryption engine may pre-process certain portions of the requested data selectively masking and/or tokenizing portions of the data creating an unencrypted portion and encrypt (with or without pre-processing) other portions of the data in order to generate and encrypted portion. The encrypted portion and the unencrypted portion may then be combined to obtain the exportable results. The encryption engine uses information in the request received by the query node (i.e. steps 402 and 404) to determine which rules apply.

In step 426, the exportable result may be transmitted directly to the requestor or may be transmitted to a request processor, which, in turn, provides the exportable result to the requestor, and the process ends.

Alternatively, in one or more additional embodiments multiple encryptable requests (i.e. steps 420-426) may be carried out in parallel. Additionally, in one or more embodiments, the query node may encrypt aggregated data prior to transmission.

In one embodiment of the technology, the determination in step 406 is not made until after the query is executed and the dated is obtained in response to the query request. In such cases, the steps may be performed in the following order: 402, 400, 408, 410, and 406. Based on the determination of step 406, the process may then proceed to either step 412 (if no encryption is required) or step 424 and 426 (if encryption is required).

The following section describes various examples in accordance with one or more embodiments of the technology. The examples are not intended to limit the scope of the technology.

Figure 5:
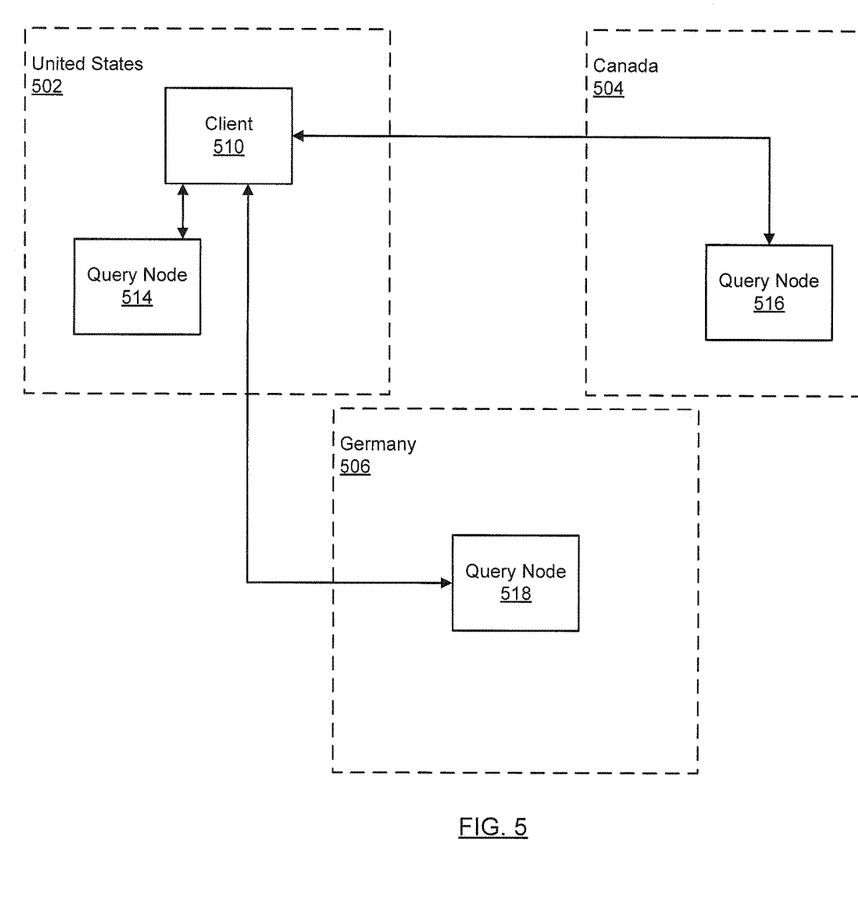
FIG. 5 shows an example in accordance with one or more embodiments of the technology.

FIG. 5 shows an example in accordance with one or more embodiments of the technology. The example is not intended to limit the scope of the technology.

In this example, there are three geographic locations: the United States (502), Canada (504), and Germany (506). In one or more embodiments according to the example, a client (510) located in the United States issues a request for data to the local query node (514), the query node in Canada (516), and the query node in Germany (518). For the purposes of the example, the client is directly requesting employee data (e.g. names and addresses) from each of the United States (502), Canada (504), and Germany (506).

The query node (514) pre-processes the request to determine the location of the requestor, the location(s) of the requested data, and any encryption rules that apply to the requested data. Based on the determination that no encryption rules apply, the query node (514) transmits the request to its local query engine (not shown), which processes the request in order to retrieve the data from the local repository (not shown). As the client (510) is local to the United States query node (514), the query node (514) transmits the locally retrieved data containing all of the employee records to the client (514) without performing any encryption.

Turning to the remote data, the client (510) transmits the request for data to the query node (516) in Canada (504). The Canadian query node (516) receives the data read request and pre-processes the request to determine the location of the requestor, the location of the requested data, and any encryption rules that apply to the requested data. Based on the determination that various encryption rules apply, the query node (516) transmits the request to its local query engine (not shown), which processes the request in order to retrieve the data from the local repository (not shown).

As the client (510) is considered remote to Canada (504) with applicable encryption rules, the query engine provides the retrieved data to an encryption engine (not shown) in the query node (514). As discussed above, the encryption engine retrieves any encryption rules related to, for example, the location of the requestor or the sensitivity level of the data. For the purposes of this example, an encryption rule exists indicating that employee address information may not leave the country without being encrypted. Therefore, the encryption engine will encrypt the data pertaining to employee addresses in the retrieved data and create an exportable result containing employee names in the clear and encrypted employee addresses. The exportable result is then transmitted back to the client (510).

Additionally, the client (510) transmits the request for data to the query node (518) in Germany (506). The German query node (518) receives the data read request and pre-processes the request to determine the location of the requestor, the location of the requested data, and any encryption rules that apply to the requested data. Based on the determination that the requested data is local to Germany (506) with applicable encryption rules, the query node (518) transmits the request to its local query engine (not shown), which processes the request and retrieves the data from the local repository (not shown).

As the client (510) is considered remote to Germany (506) with applicable encryption rules, the query engine provides the retrieved data to an encryption engine (not shown) in the query node (518). As discussed above, the encryption engine retrieves any encryption rules related to, for example, the location of the requestor or the sensitivity level of the data. For the purposes of this example, an encryption rule exists indicating that no employee information may leave the country without being encrypted and addresses may not leave at all. Therefore, the encryption engine removes all data from the retrieved data pertaining to employee addresses and encrypts the remaining name fields to create an exportable result. The exportable result is then transmitted back to the client (510).

Figure 6:
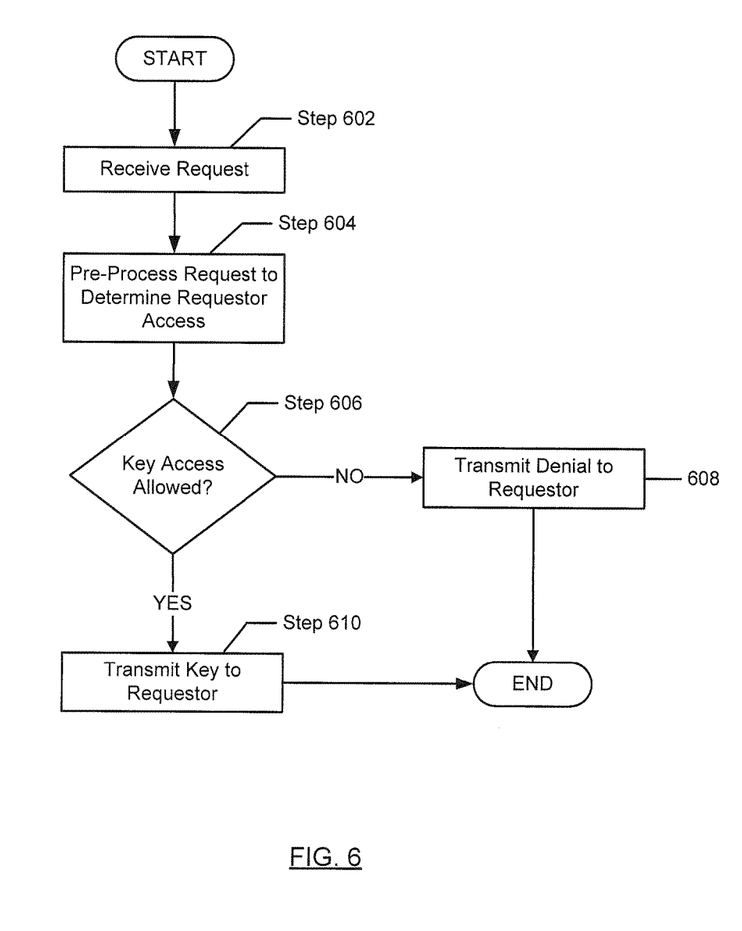
FIG. 6 shows an example method for requesting keys in accordance with one or more embodiments of the technology.

FIG. 6 shows an example method for requesting keys in accordance with one or more embodiments of the technology.

In step 602, the key server receives a request for an encryption key. As discussed above, the request may originate from a client or from a query node that is decrypting aggregated data to be sent to a client.

In step 604, the key server pre-processes the request to determine the access level of the requestor. In one or more embodiments, the access level may be related to the geographic location of the requestor. That is, only requestors local to the key server may obtain the local keys. In one or more other embodiments, the access level may also be related to a security clearance level. Furthermore, the access level may also relate to varying corporate structures and/or network domain rules.

In step 606, a determination is made as to whether the requestor is allowed access to the requested key. Based on the determination that the requestor is not allowed to retrieve the requested key, in step 608 the key server transmits a denial to the requestor. However, if the determination is made that the requestor is allowed to access the key, the key server then transmits the key to the requestor in step 610. In one or more embodiments, keys issued by the key server may be temporary. In other words, the requesting entity may need to interrogate the key server each time a key is used to ensure that the key is still valid. Alternatively, keys may be temporary and expire after a given time period. As yet another alternative, keys may be linked to a geographic location and expire once a requestor moves from one geographic location to another geographic location.

In one or more embodiments a key server may maintain a table of mappings between keys and geographic boundaries (i.e., areas bounded by one or more latitude and longitude values and/or any other mechanism to specify a geographic boundary). In one or more embodiments, a local agent (or process) (not shown) may be executing on the processor and when a requestor attempts to decrypt data with a key that has been previously received from the key server, the local agent may intercept this action and then send a request (that includes the current location of the requestor) to the key server. The key server may use this information to determine whether the requestor is permitted to use the key to decrypt the data based on the requestor current location. If the requestor is permitted to view the data, then key server sends a response to the local agent indicating that the key may be used to decrypted the data. If the requestor is not permitted to view the data, then key server sends a response to the local agent indicating that the key may not be used to decrypted the data.

The aforementioned process may be performed to decrypt encrypted data and periodically thereafter while the requestor has the data in unencrypted form. If the requestor stops using the data (e.g., the requestor closes the application that is used to view the data), then the local agent (or another process) may re-encrypt the data and remove (or delete) the key from the client.

Figure 7:
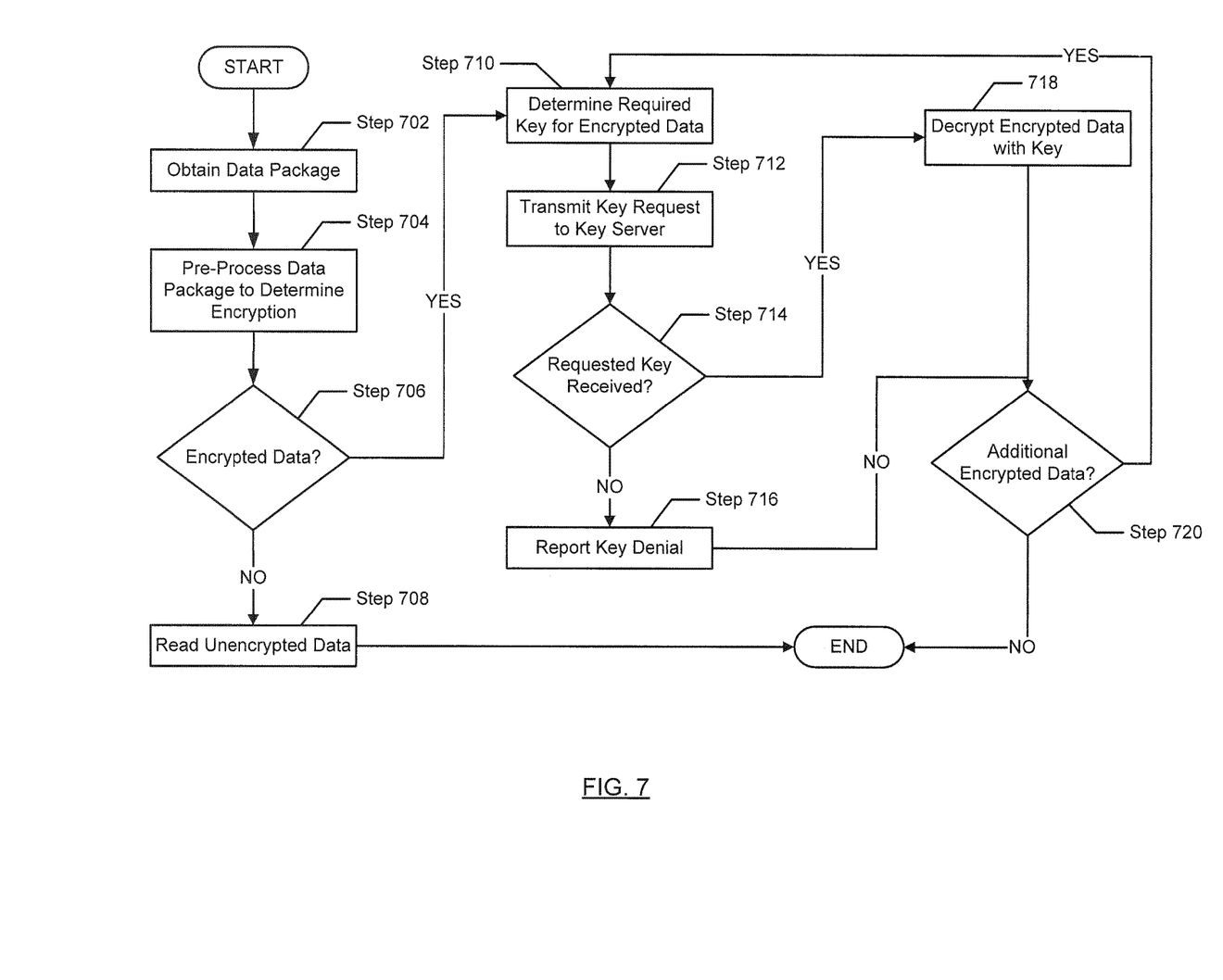
FIG. 7 shows an example method for viewing data in accordance with one or more embodiments of the technology.

FIG. 7 shows an example method for viewing data in accordance with one or more embodiments of the technology.

In step 702, a client obtains a data package such as, for example, by one or more embodiments according to the method described above in FIG. 5 above. In step 704, the client pre-processes the data package to determine (in step 706) if any portions of the data package are encrypted. If all portions of the data package are unencrypted, the client proceeds to step 708. In one or more embodiments, the request may contain portions of data that are encrypted and portions that are not encrypted. Thus, in one or more embodiments, the process may proceed separately to step 708 and step 710. Alternatively, in one or more embodiments, the process may proceed to step 708 and step 710 simultaneously for parallel execution. However, in one or more embodiments, entire data packages may be encrypted and other entire data packages may not be encrypted.

In step 708, any unencrypted data is read. The data may be viewed and the process ends.

Turning to the case in which the data package contains encrypted portions, the process proceeds to step 710. In step 710, the client determines which key or keys will be necessary to decrypt the encrypted data. In one or more embodiments, the encrypted data may contain metadata directed to a required key. Alternatively, the client may interrogate the key server to determine which key is necessary to decrypt the encrypted data.

In step 712, once the necessary key or keys have been determined the client transmits the key request to the key server. In one embodiment of the technology, step 710 may not be performed. Instead, a key request may be directly sent to the key server requesting a key to decrypt the encrypted data in the data package. In this scenario, the key server request includes sufficient information to enable the key server to determine the appropriate key to provide to the client.

Continuing with the discussion of FIG. 7, in step 714, a determination is made as whether the key server responded by returning the requested key. If the key server denied the request the process proceeds to step 716. If the key server returned the requested key then the process proceeds to step 718.

The key server may deny the request if the requestor is not permitted to decrypt the encrypted data. This determination may be based on, for example, the location of the requestor and/or what data the client is attempting to decrypt. The key server may include one or more rules to make the above determination. The rules about whether to provide a key for decryption may be substantially similar to the rules used by the encryption engine to determine whether to encrypt data (or portions thereof) returned in response to a query request. Examples of rules that may be used to determine whether to provide a decryption key to the client are provided in FIGS. 8A-8B.

In step 716, the key server has denied the key request. The denial may be reported to, for example, a client or end user. In one or more embodiments, the denial report may take the form of an error message. Alternatively, the denial may result in a portion of the data not being read or displayed. The process may then proceed to Step 720.

If the key server returned the requested key then the process proceeds to step 718. In step 718, the client decrypts the encrypted data with the key and returns the result. In one or more embodiments, the result may be displayed to an end user or stored in the client for further processing. Once the result has been obtained, the process proceeds to step 720 to determine whether there is additional encrypted data to be read. If there is no additional encrypted data to be read, the process ends. However, if there is additional encrypted data to be read the process returns to step 710.

Alternatively, in one or more additional embodiments, multiple key requests (i.e. the process branch beginning with step 710) may be carried out in parallel. Additionally, in one or more embodiments, the decrypted results may be aggregated prior to viewing.

In step 720, a determination is made as to whether there is additional encrypted data to be read. If there is no additional encrypted data to be read, the process ends. However, if there is additional encrypted data to be read the process proceeds to step 710.

FIG. 8A shows an example in accordance with one or more embodiments of the technology. The example is not intended to limit the scope of the technology.

In this example, there are two geographic locations: the United States (802) and Russia (808). In one or more embodiments according to the example, a client (810) located in the United States issues a request for data to the local query node (814) and the query node in Russia (816). For the purposes of the example, the client is requesting employee data (e.g. name, position, and salary) from corporate offices in each of the United States (802) and Russia (808).

The query node (814) pre-processes the request to determine the location of the requestor and the location(s) of the requested data. Based on the determination that the location of the requested data and the requestor are local, the query node (814) transmits the request to its local query engine (not shown), which retrieves the data from the local repository (not shown). The query node (814) determines if any encryption rules apply to the retrieved data.

Based on the determination that there are applicable encryption rules, the query node (814) provides the retrieved data to its local encryption engine. In this example, the encryption engine retrieves a rule for the salary information. The salary information for employees earning more than $100,000 a year is not allowed to be retrieved and therefore the encryption engine removes this data from the retrieved data. Further, the encryption engine retrieves another rule indicating that position and salary must be encrypted. Therefore, the encryption engine encrypts the position and salary fields to create an exportable result. The query node (814) then returns the exportable result containing the clear (i.e. unencrypted) name fields along with the encrypted position and salary fields to the client.

The client (810) then reads the exportable result and determines that the name fields may be read immediately while the remaining fields are encrypted. The client (810) issues a key request to the local key server (not shown) in the United States (802). The key server then determines that the client is local to the United States (802) and issues the requested key to the client. Once the requested key is received then the client (810) may decrypt the exportable result and view the position and salary fields.

Turning to the remote data, the client (810) transmits the request for data to the query node (816) in Russia (808). The Russian query node (816) receives the data read request and pre-processes the request to determine the location of the requestor and the location of the requested data. Based on the determination that the requested data is local to Russia (808) and the requestor is remote, the query node (816) transmits the request to its local query engine (not shown), which retrieves the data from the local repository (not shown).

As the client (810) is considered remote to Russia (808) with applicable encryption rules, the query engine provides the retrieved data to an encryption engine (not shown) in the query node (816). As discussed above, the encryption engine retrieves any encryption rules related to, for example, the location of the requestor or the sensitivity level of the data. For the purposes of this example, an encryption rule exists indicating that all employee information may not leave the country without being encrypted. Therefore, the encryption engine will encrypt all of the data and create an exportable result. The exportable result is then transmitted back to the client (810).

The client (810) then attempts to read the exportable result and determines that all of the fields are encrypted. The client (810) issues a key request to the local key server (not shown) in the United States (802). However, the local key server in the United States (802) does not have the applicable key to decrypt the data and thus denies the key request. As a result, the client (810) is not able to decrypt and view the Russian data. In one or more embodiments, the client (810) may also make the determination that the applicable key for decrypting the Russian data is not available in the current locale.

FIG. 8B shows an example in accordance with one or more embodiments of the technology. The example is not intended to limit the scope of the technology.

Continuing from the example shown in FIG. 8A, there are two geographic locations: the United States (802) and Russia (808). In one or more embodiments according to the example, the client (810) previously located in the United States has now traveled to Russia (808). Further, assume that the client (810) still has the exportable results that it retrieved in the previous example. Specifically, the client (810) has the partially encrypted exportable result from the United States (802) repository and the completely encrypted exportable result from the Russian (808) repository.

The client (810) may then attempt to again read the exportable result from the United States (802) and determine that the name fields may be read immediately while the remaining fields are encrypted. The client (810) issues a key request to the local key server (not shown) in Russia (808). However, the local key server in Russia (808) does not have the applicable key to decrypt the data and thus denies the key request. As a result, the client (810) is not able to decrypt and view the encrypted United States employee data. In one or more embodiments, the client (810) may also make the determination that the key for decrypting the United States data is not available in the current locale. As discussed above, the client (810) may also still have a temporary key issued from the United States (802) key server, but the key is expired once the client (810) leaves the United States (802) jurisdiction.

The client (810) may attempt to read the exportable result from Russia (808) and determine that all of the fields are encrypted. The client (810) issues a key request to the local key server (not shown) in Russia (808). The key server then determines that the client is local to Russia (808) and issues the requested key to the client. Once the requested key is received then the client (810) may decrypt the Russian exportable result and view the name, position, and salary fields.

FIG. 9 shows a computing system in accordance with one or more embodiments of the technology.

Embodiments of the technology may be implemented on a computing system. Any combination of mobile, desktop, server, embedded, or other types of hardware may be used. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (900) may be located at a remote location and connected to the other elements over a network (912). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

In one or more embodiments, a record of any queries executed by the local query nodes may be maintained in local or global logs depending on encryption restrictions. In one or more embodiments, the resulting dataset is stored together with the applied encryption rules and the field operation audit log as proof that the encryption rules were enforced during query operations.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for requesting data comprising:
   receiving, from a requestor, a query request to read data located in a first geographic location, wherein the requestor is located in a second geographic location;
   executing the query request by a query engine in the first geographic location to obtain a query result, wherein the query result comprises the data;
   obtaining a first geographic location specific encryption-rule based on at least one selected from a group consisting of the first geographic location and the second geographic location, wherein the first geographic location specific encryption rule specifies a geographic relationship between the requestor and the first geographic location;
   generating a first exportable result by applying the first geographic location specific encryption-rule to the query result, wherein applying the first geographic location specific encryption-rule comprises:
      encrypting a first portion of the data to obtain an encrypted portion using a key to which the requestor does not have access when the first exportable result is generated,
      tokenizing a second portion of the data to obtain a tokenized portion,
      combining both of the encrypted portion and the tokenized portion with a third portion of the data that is not the first portion to obtain the first exportable result; and
   transmitting the first exportable result to the requestor.

2. The method of claim 1, further comprising:
   receiving a second query request to read a second data from a second requestor located in the first geographic location;
   executing the second query request at the query engine in the first geographic location to obtain a second query result;
   making a determination that the second requestor and the data specified by the second query request are located in the same geographic region; and
   in response to the determination, transmitting the second query result to the second requestor without applying any geographic location specific encryption rules.

3. The method of claim 1,
   wherein the query engine is executing on a first query node,
   wherein the requestor is a second query node.

4. The method of claim 1, wherein the requestor is an intermediate requestor.

5. The method of claim 4, further comprising:
   receiving, by the intermediate requestor, the first exportable result; and
   transmitting, by the intermediate requestor, the first exportable result to a source requestor.

6. The method of claim 4, further comprising:
   receiving, by the intermediate requestor, a second query request to read data located in a third geographic location;
   providing the second query request to a second query engine in the third geographic location;
   receiving, from the second query engine, a second exportable result;
   generating, by the intermediate requestor, an aggregated result comprising the first exportable result and the second exportable result; and
   transmitting the aggregated result to a source requestor.

7. The method of claim 1, wherein the first geographic location specific encryption rule specifies one selected from a group consisting of removing at least one field from the query result, masking at least one field from the query result, and tokenizing at least one field from the query result.

8. A method for viewing data comprising:
obtaining, by a requestor located in a first geographic location, a data package comprising an unencrypted field, a tokenized field, and a first encrypted data field, wherein the data package is obtained from a source located in the first geographic location, wherein the data does not include either of the tokenized field and the first encrypted data field;
transmitting a request for a first key to a first key server located in the first geographic region while the requestor is located in the first geographic location, wherein the first key enables decryption of the first encrypted data field;
receiving the first key from the first server, wherein the first key is associated with a first geographic location specific encryption rule that specifies a geographic relationship between a requesting entity that requested the data and the first geographic location; and
decrypting the first encrypted data field with the first key.

9. The method of claim 8, further comprising:
transmitting a request for a second key to a second key server located in a second geographic region while the requestor is located in the second geographic location, wherein the second key enables decryption of a second encrypted data field of the data package; and
receiving a denial from the second key server.

10. The method of claim 9, further comprising:
transmitting a request for the second key to the first key server while the requestor is located in the first geographic location;
receiving the second key from the first key server; and
decrypting the second encrypted data field with the second key.

11. The method of claim 9, further comprising:
receiving, by the requestor, a data encryption request that specifies the decrypted first encrypted data field; and
encrypting, by the requestor, the decrypted first encrypted data field.

12. A system comprising:
a first query node located in a first geographic location comprising a data repository, a query engine, and an encryption engine;
wherein the first query node is connected to a network and configured to:
receive from a requestor a query request to read data located in the first geographic location, where the requestor is located in a second geographic location;
execute, by the query engine, the query request by the query engine to obtain a query result, wherein the query result comprises the data;
obtain, by the encryption engine, a first geographic location specific encryption rule based on at least one of the first geographic location and the second geographic location, wherein the first geographic location specific encryption rule specifies a geographic relationship between the requestor and the first geographic location;
generate, by the encryption engine, a first exportable result by applying the first geographic location specific encryption rule to the query result, wherein applying the first geographic location specific encryption rule comprises:
encrypting a first portion of the data to obtain an encrypted portion using a key to which the requestor does not have access when the first exportable result is generated,
tokenizing a second portion of the data to obtain a tokenized portion,
combining both of the encrypted portion and the tokenized portion with a third portion of the data that is not the first portion to obtain the first exportable result; and
transmit the first exportable result to the requestor.

13. The system of claim 12, the first query node further configured to:
receive a second query request to read a second data from a second requestor located in the first geographic location;
execute the second query request at the query engine in the first geographic location to obtain a second query result;
making a determination that the second requestor and the data specified by the second query request are located in the same geographic region; and
in response to the determination, transmit the second query result to the second requestor without applying any geographic location specific encryption rules.

14. The system of claim 12, wherein the requestor is a second query node.

15. The system of claim 12, wherein the requestor is an intermediate requestor.

16. The system of claim 15,
wherein the requestor is configured to:
receive the first exportable result; and
transmit the first exportable result to a source requestor.

17. The system of claim 15,
wherein the requestor is configured to:
receive a second query request to read data located in a third geographic location;
provide the second query request by a second query engine in the third geographic location;
receive, from the second query engine, a second exportable result;
generate an aggregated result comprising the first exportable result and the second exportable result; and
transmit the aggregated result to a source requestor.

18. The system of claim 12, wherein the first geographic location specific encryption rule specifies removing at least one field from the query result.

* * * * *